(12) United States Patent
Arev et al.

(10) Patent No.: US 6,801,603 B1
(45) Date of Patent: Oct. 5, 2004

(54) ONLINE AGGREGATION

(75) Inventors: Amos Arev, Savyon (IL); Yael Shain, Kiryat-Ono (IL); Eugene Neystadt, Kfar-Saba (IL)

(73) Assignee: Comverse Ltd., Tel Aviv (IL)

( * ) Notice: Subject to any disclaimer, the term of this patent is extended or adjusted under 35 U.S.C. 154(b) by 0 days.

(21) Appl. No.: 09/473,837

(22) Filed: Dec. 28, 1999

(51) Int. Cl.[7] .............................................. H04M 1/64
(52) U.S. Cl. .............................. 379/88.17; 379/88.12; 379/88.13
(58) Field of Search ........................... 379/67.1, 88.13, 379/88.14, 88.17, 88.18, 88.26–88.28

(56) References Cited

U.S. PATENT DOCUMENTS

| | | | |
|---|---|---|---|
| 4,837,798 A | 6/1989 | Cohen et al. | |
| 5,333,266 A | 7/1994 | Boaz et al. | |
| 5,436,961 A | 7/1995 | Kobayashi | |
| 5,444,768 A | 8/1995 | Lemaire et al. | |
| 5,608,786 A | 3/1997 | Gordon | |
| 5,633,916 A | 5/1997 | Goldhagen et al. | |
| 5,647,002 A | 7/1997 | Brunson | |
| 5,675,507 A | * 10/1997 | Bobo, II | 709/206 |
| 5,760,823 A | 6/1998 | Brunson et al. | |
| 5,768,513 A | 6/1998 | Kuthyar et al. | |
| 5,794,039 A | * 8/1998 | Guck | 707/103 R |
| 5,872,926 A | 2/1999 | Levac et al. | |
| 5,948,059 A | 9/1999 | Woo et al. | |
| 5,951,638 A | 9/1999 | Hoss et al. | |
| 5,991,365 A | 11/1999 | Pizano et al. | |
| 6,031,896 A | * 2/2000 | Gardell et al. | 379/88.17 |
| 6,034,970 A | 3/2000 | Levac et al. | |
| 6,038,296 A | 3/2000 | Brunson et al. | |
| 6,055,240 A | 4/2000 | Tunnicliffe | |
| 6,061,570 A | 5/2000 | Janow | |
| 6,072,862 A | 6/2000 | Srinivasan | |
| 6,081,518 A | 6/2000 | Bowman-Amuah | |
| 6,175,858 B1 | 1/2001 | Bulfer et al. | |
| 6,181,781 B1 | 1/2001 | Porter et al. | |
| 6,233,318 B1 | 5/2001 | Picard et al. | |
| 6,243,374 B1 | 6/2001 | White et al. | |

FOREIGN PATENT DOCUMENTS

EP    0 845 894 A2    6/1998

* cited by examiner

Primary Examiner—Roland Foster
(74) Attorney, Agent, or Firm—Sughrue Mion, PLLC

(57) ABSTRACT

Method and apparatus for providing a centralized access, in real-time, to messages received in, or sent from two or more mail accounts of a user. Data related to incoming and/or outgoing messages from one or more accounts of the user is continuously aggregating and/or stored in real-time. The user accesses each aggregated message received in, or sent from one or more accounts, from each of the accounts. The status of the user's aggregated updated and/or outgoing messages may be continuously updated and/or displayed to the user, in real-time.

30 Claims, 2 Drawing Sheets

ONLINE AGGREGATION

FIELD OF THE INVENTION

The present invention relates to the field of electronic messaging. More particularly, the invention relates to a method and apparatus for providing a centralized access, in real-time, to messages stored in a plurality of message stores, such as different electronic mail accounts, used by a user.

BACKGROUND OF THE INVENTION

Conventional messaging applications, such as E-mail readers and E-mail servers, operate according to an architecture, which is designed to handle a single account of a specific user at a time. As E-mail messaging became a more widespread technology, many users have more than one E-mail account. For example, a user may have an account at work, a private E-mail account at home, an E-mail account provided by the portal of his Internet service provider, wireline and/or cellular voice-mail, corporate voice-mail, etc.

When the user wishes to check his messages, he has to access his mailbox in each account. The user may use several different applications to access his voice-mail account, his e-mail account at work or e-mail account at home. However, this procedure is cumbersome and time consuming, since the user has to access his mailbox in each account and to check its status. More advanced methods provide the user with direct access to several E-mail sources. However, these methods also remain problematic, since the user still has multiple and separate inboxes, and inconvenient control over his outgoing mail.

Another method for centralizing the mail intended for a single user, from different mail sources, is the "forwarding" method. This method allows the user to forward his E-mail, voice-mail and fax messages to a single account, in which they can be stored and/or handled. However, this method suffers from storage limitations, since all the forwarded mail is stored in a single account, and some mail providers charge the user for forwarding services. In addition, in order to provide to the user an effective mail service, the storage location should be accessible from all accounts of the user (i.e., from his PC at home, from his workstation at work, from his cellular phone, etc.), located at different places. Additionally, the management of a central storage location does not conveniently allow for the updating of the mailboxes at the individual locations, thus often requiring double effort in managing incoming messages.

Online services, such as Hotmail™ allow the user to poll and download mail from several different accounts into a single account, and to handle his mail from this account. However, this method also consumes storage resources, since the online service provider should store all the E-mail messages intended for each user. In addition, such concentrated storage of all the intended mail in a single location raises privacy and/or security problems.

The methods described above do not provide a satisfactory solution to another problem, since sent messages, when stored, are kept in the account from which they are sent, and not in a single location. In addition, due to economic and/or security reasons, when the user wishes to check his mailbox in each account through his telephone, some telephone companies do not provide a way for him to access his account via the Internet. Instead, in order to read his E-mail (Internet) at work, the user has to establish a telephonic connection with the Internet provider of the account at work. Then, in order to read his voice-mail at work, he has to establish a telephonic connection with the voice-messaging provider of the account at work. Of course, this procedure is relatively slow and costly, since the user has to dial several providers, and remain connected until he checks the status of his mailbox in each separate account. The procedure for checking the inbox in each account may take several minutes.

None of the methods described above has provided a satisfactory solution to the problem of providing centralized access, in real-time, to multiple messaging accounts of a user.

It is an object of the present invention to provide a real-time, centralized access, to a plurality (two or more) of electronic-mail (E-mail) accounts of a user, which overcomes the drawbacks of the prior art.

It is another object of the present invention to provide a method and apparatus for providing centralized access, in real-time, to a plurality of electronic-mail (E-mail) accounts of a user, which eliminates the need for duplicate storage of messages.

It is a further object of the present invention to provide a method and apparatus for providing centralized access, in real-time, to a plurality of electronic-mail (E-mail) accounts of a user, which is transparent to the regular interaction of the user with the E-mail system and to existing software.

It is still another object of the present invention to provide a method and apparatus for providing centralized access, in real-time, to a plurality of electronic-mail (E-mail) accounts of a user, which stores his sent massages from all accounts in a single location.

It is still another object of the present invention to provide a method and apparatus for providing centralized access, in real-time, to a plurality of electronic-mail (E-mail) accounts of a user, which reduces privacy and security problems.

Other objects and advantages of the invention will become apparent as the description proceeds.

SUMMARY OF THE INVENTION

The present invention is directed to a method for providing a centralized access, in real-time, to messages received in, or sent from two or more mail accounts of a user. Data related to incoming and/or outgoing messages from one or more accounts of the user is continuously aggregated and/or stored, in real-time. The user accesses each aggregated message received in or sent from the one or more accounts, from each of the one or more accounts. The aggregated data may be the whole incoming and/or outgoing message. Preferably, the status of his aggregated and/or incoming and/or outgoing messages is continuously updated and/or displayed, in real-time to the user. The term "mail account", in the context of the present invention, should be interpreted in its broadest sense, and includes every messaging system dealing with messages that can be electronically transmitted, including, but not limited to, Internet mail, e-mail, voice mail, fax mail, video mail, etc. Incoming and/or outgoing messages may include, e.g., electronic mail (E-mail), voice-mail, fax mail, video mail, or Internet/Web-mail messages. A unique ID is assigned in real-time to each message, destined to, or sent from, any account of the user and a list of aggregated unique IDs of all messages is generated. The unique ID of each message is then stored in a storage, while continuing to assign in real-time a unique ID to each new message and to update the list accordingly. The user has access to the storage from any of his accounts. Upon receiving from the user a request to access a message, the request is routed to the location in which the message is stored, according to the unique ID of the requested message, and the message is retrieved therefrom.

Preferably, the location in which the message is stored is the actual server which provides messaging services to the specific account of the user, to which the message is addressed, or from which the message is sent. Different protocols associated with different messages are unified into a common protocol which provides unified messaging services provided by the different protocols, and the user is allowed to access messages using the common protocol. Unifying messaging protocols is, of course, within the skill of the routineer, and is therefore not discussed herein in detail, for the sake of brevity.

The user can access an aggregated message via a messaging terminal, such as a wireline telephone, a cellular telephone, a Web browser or a workstation, which are linked to the store. An indication may be added to each accessed message, for allowing the user to distinguish between messages having different attributes, particularly read and unread messages.

According to one preferred embodiment of the invention, each message is aggregated by reading at least a portion of the message, transferring the read portion to, and storing it in the storage.

The invention is also directed to a messaging system providing a centralized access, in real-time, to messages received in, or sent from a plurality of mail accounts of a user, which comprises:

a) means for aggregating, in real-time, data related to incoming and/or outgoing messages from one or more accounts of the user; and b) means for accessing, by the user, each aggregated message received in, or sent from said one or more accounts, from each of said one or more accounts.

Preferably, but without limitation, the messaging system further comprises circuitry and/or software for continuously updating and/or displaying to the user, in real-time, the status of his aggregated and/or incoming and/or outgoing messages. The messaging system may further include a common protocol (such as IMAP4) consisting of unified different protocols associated with different messages, which is used to support unified messaging services provided by the different protocols. Preferably, the messaging system comprises messaging terminal means linked to the storage, for accessing an aggregated message. The messaging terminal means include a wireline telephone, a cellular phone, a Web browser or a workstation. The system may further comprise circuitry and/or software for adding an indication to each accessed message, used to distinguish between different attributes of the messages, particularly between read and unread messages.

BRIEF DESCRIPTION OF THE DRAWINGS

The above and other characteristics and advantages of the invention will be better understood through the following illustrative and non-limiting detailed description of preferred embodiments thereof, with reference to the appended drawings, wherein.

DETAILED DESCRIPTION OF PREFERRED EMBODIMENTS

Figure 1:
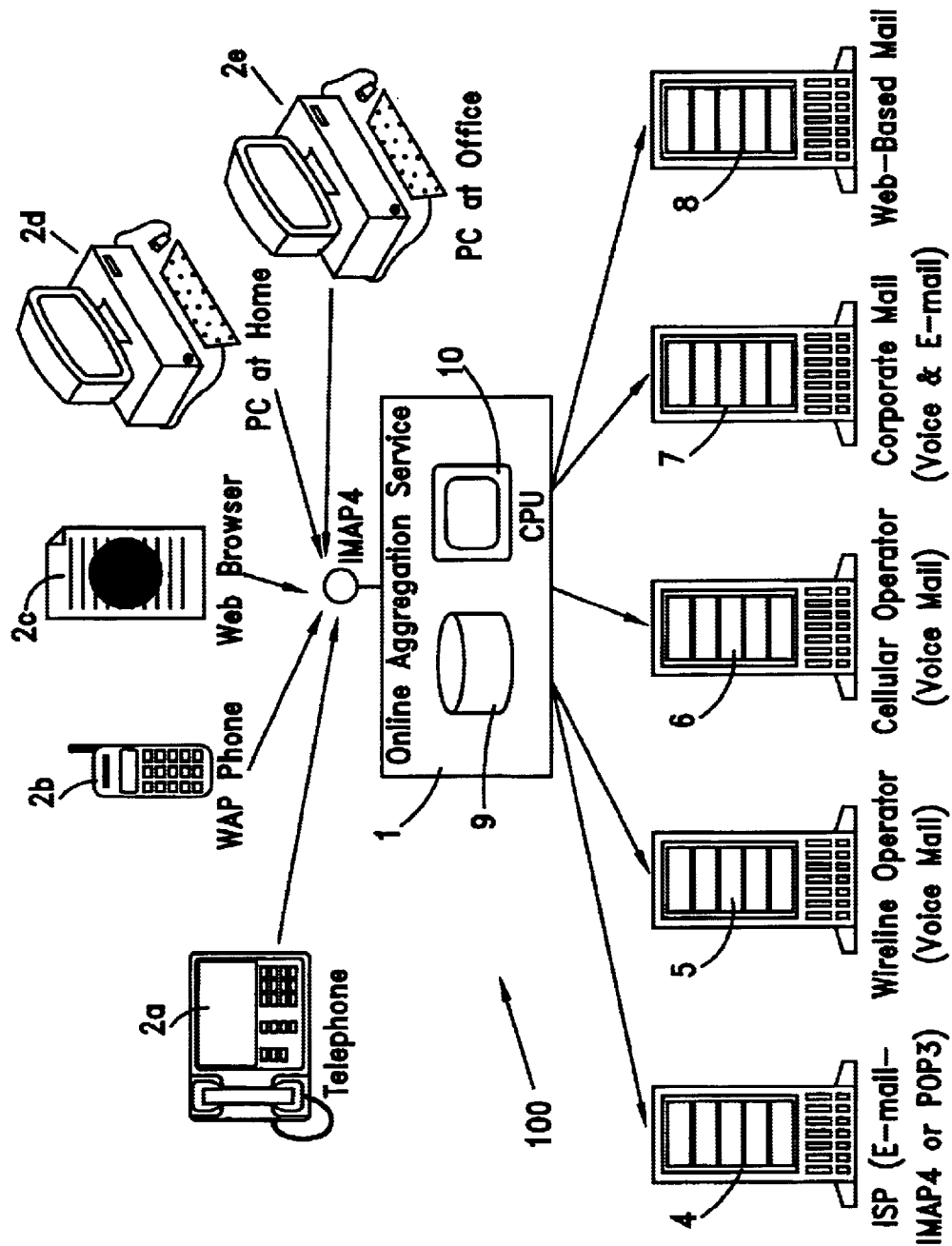
FIG. 1 schematically illustrates the structure of a system which provides real-time access to E-mail messages aggregated from multiple accounts, according to a preferred embodiment of the invention.

FIG. 1 schematically illustrates the structure of a system which provides real-time access to E-mail messages aggregated from multiple accounts, according to a preferred embodiment of the invention. The system 100 includes a set of several messaging means, 2a to 2e. In this example, the user can read his messages using a wireline telephone 2a, a cellular telephone 2b, a Web browser 2c, a PC 2d located at home and another PC 2e located at work. The cellular telephone 2b can be any telephone which is compatible with Wireless Application Protocol (WAP) or the like, which is a protocol that enables a cellular telephone (handset) to run preprogrammed data processing applications. The messages destined to each messaging means, are stored in one or more corresponding servers. The system 100 comprises a set of servers, 4 through 8, from which a desired message can be accessed and read by the user. In this particular illustrative example, server 4 is the Internet Service Provider (ISP) server (the server which provides the user with access to the Internet), server 5 provides voice-mail messaging services to wireline telephone 2a, server 6 provides voice-mail messaging services to cellular telephone 2b, server 7 provides corporate mail messaging (integrated E-mail and voice-mail) services to workstations 2d and 2e, and server 8 provides Web based mail messaging services to Web browser 2c. Access from the set of messaging terminal means (2a through 2e) to the set of servers (4 through 8) is carried out through a message-aggregating server 1, connected between the set of servers and the set of message terminal means. The message-aggregating server 1 allows access to messages using a suitable protocol, such as IMAP4, which defines how a user can access and/or manipulate a mail storage, or Post Office Protocol version 3 (POP3), which is used for similar purposes and is simpler.

According to a preferred embodiment of the invention, the operations of the message-aggregating server 1 are carried out without actually storing the messages therein. These operations, required for handling the messages in all accounts, comprise inter alia, folder and message listing (e.g., generating an "inbox" folder and directing incoming messages into that folder), message removal from, and/or insertion into mailboxes, etc. These message-handling operations are directed in real-time to the (real) set of mail servers 4 through 8, and are actually carried out in these servers. The message-aggregating server 1 integrates the capabilities of different mail storage protocols, and transforms them into a single common protocol, having additional emulation capabilities that are required to provide the user with an on-line aggregated view of his mail in all accounts. For example, the simple commonly used POP3 does not support the capability to distinguish between different attributes of messages, such as between read and unread mail (which is usually provided by marking the titles of unread messages and/or the mailbox containing unread messages in Graphical User Interface (GUI), e.g., using bold letters. In this case, the message-aggregating server 1 (operating as an on-line message aggregator), which comprises a local store unit 9, stores this discriminative information in its local storage unit. The operation of the message-aggregating server 1 is controlled by a Central Processing Unit (CPU) 10 of a suitable computer. In addition, the message-aggregating server 1 provides capabilities, such as creating folders, that are not available in several types of messaging systems, such as voice-mail and/or messages that are delivered using the POP3. The message-aggregating server 1 can handle messages arriving from such message systems in a way similar to the messages arriving from accounts having folder capabilities (e.g., distribution to "inbox", outbox, etc.).

According to another preferred embodiment of the invention, aggregation of messages destined to the user from several accounts is carried out by the message-aggregating server 1 using asynchronous pipelining technique. According to this technique, a system or an application starts to produce output before all the input has been received and processed. Instead, a result, which corresponds to an input, appears at the output at the moment when the processing of that input has been completed). This technique permits providing the user, who is connected on-line to an account, an aggregated view of his messages from his mailboxes in all his accounts, which is updated in real-time. Asynchronous "piplining" technique may be implemented by the message-aggregating server 1, for example, using a pool of threads. These threads can asynchronously read and write portions of a message, thereby accelerating the aggregation of messages. In this context, "thread" is defined as the basic entity to which the operating system allocates CPU time. A thread can execute any part of the application's code, including a part currently being executed by another thread. All threads of a process share the virtual address space, global variables, and operating-system resources of the process.

In order to present the user an aggregated "inbox" containing intended messages from all his accounts, the lists of incoming messages from each account are merged by the message-aggregating server 1 in real-time. In addition, an unique Identifier Data (ID) is assigned to each message that is integrated into the aggregated "inbox". The unique ID of each aggregated message is stored in the storage unit 9 of the message-aggregating server 1. On-line merging of incoming messages can be obtained by starting to process data which arrives from each server of the set of servers 4 through 8, at the moment when a portion of the data arrives to the message-aggregating server, and before the response of the message-aggregating server 1 is fully completed. Processing which is carried out only after the response of the message-aggregating server 1 is fully completed, may slow down the aggregation rate of messages.

The following example illustrates the aggregation process of incoming messages by the message-aggregating server 1. In this example, the user has an E-mail account "A" at home, and another E-mail account "B" at work. Three messages, having original (before aggregation and in the conventional separate account) IDs, A1 through A3 and B1 through B3, are addressed to each account in the order: A1 (the first), B1, B2, A2, B3, and A3 (the last). A new and unique ID is assigned in real-time (and stored in the store unit 9) to each message, according to the aggregated arriving order:

| Original IDs of A | Original IDs of B | New Aggregated ID |
|---|---|---|
| A1 | | #1 |
| | B1 | #2 |
| | B2 | #3 |
| A2 | | #4 |
| | B3 | #5 |
| A3 | | #6 |

The original ID of each arriving message is "mapped" on-line by the message-aggregating server 1, into a unique ID in the aggregated order and the "mapped" ID is then stored in the store unit 9 as soon as it is retrieved, without "waiting" for the generated ID of other messages located in the same account.

Figure 2:
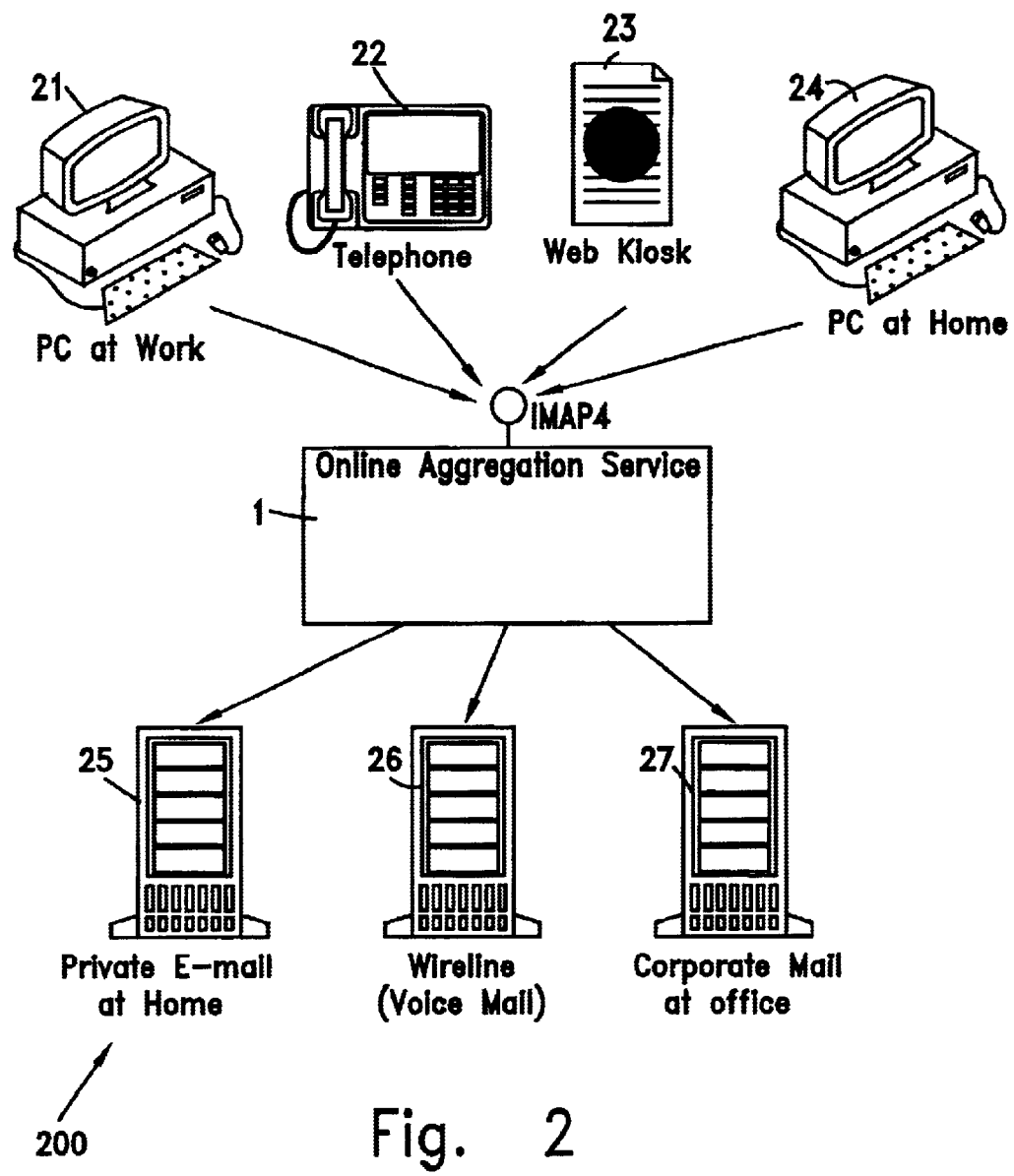
FIG. 2 schematically illustrates the flow of messages in a system which provides real-time access to E-mail messages aggregated from multiple accounts, according to a preferred embodiment of the invention.

FIG. 2 schematically illustrates the flow of messages in a system that provides real-time access to E-mail and other messages aggregated from multiple accounts, according to a preferred embodiment of the invention. The system 200 comprises a set of several messaging means, 21 through 24. In this example, the user can read his messages using a PC 21 located at work, a wireline telephone 22, a Web kiosk 23 (i.e., a presentation device which is used to display a series of Hyper Text Markup Language (HTML) pages and/or graphics with or without user interaction or exploration features), and another PC 24 located at home. The messages addressed to each messaging means is stored in a corresponding server. The system comprises a private mail server 25, a wireline and voice-mail server 26, and a corporate mail server 27 at the office of the user, each of which stores messages corresponding to one or more messaging means. A desired message can be accessed and read by the user from the corresponding server. Access to all messages is carried out through a message-aggregating server 1, connecting between the messaging terminal means and their corresponding servers.

In this example, the user has an E-mail account at his work (stored in server 27), a personal E-mail account at home (stored in server 25) and the voice-mail account at his telephone at home (stored in server 26). Most of the time, the user works with his PC 21 at work (his office), from which he wishes to read his E-mail and/or voice-mail sent to all accounts. The user's favorite E-mail reader is pointed to message-aggregating server 1, which provides to the user access to both E-mail accounts (servers 25 and 27), as well as to voice-messages left for him at home (server 27). If the user is at home, working with his home PC 24, he can access his private E-mail (stored in server 25), his E-mail at work (stored in server 27) and again his voice-mail (stored in server 26), by simply pointing his E-mail reader to message-aggregating server 1. If the user is outside his office and not at home, he can access his messages in all three accounts (all three servers 25 through 27) from a regular phone, by using an E-mail-to-Speech service, pointed again to message-aggregating server 1. When the user is traveling, he can use the Web Kiosks 23 placed in airports (used to display information to people walking by) to view presentations, or to access and read (from the same Kiosk) his messages in both accounts (servers 25 and 27) or to listen to his voice-messages (server 27), by pointing his Web mail to message-aggregating server 1. This enables the user to continue using his E-mail reader without any modifications, as if he had a single account.

According to another preferred embodiment of the invention, the mail sent from each terminal is stored in a single (or in several) account, to which the user has access from location. Sent mail can be actually stored in one of the mail servers from which the message was sent. By using a single account to keep mail sent from all terminals, the access to sent messages as well as backup (i.e., creating a duplicate storage of sent messages for safety) procedures becomes easier, since it is required to backup only a single (rather than multiple) storage.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A method for providing a centralized access, in real-time, to messages received in, and sent from at least two mail accounts of a user, comprising:
   a) continuously aggregating or storing, in real-time at a centralized location, data related to incoming and outgoing messages, when said incoming messages are received in and said outgoing messages are sent from said accounts of said user, without storing said incoming and outgoing messages at said centralized location during operations related to said aggregating and storing of said data related to said incoming or outgoing messages;
   b) allowing said user to access each incoming and outgoing message received in, and sent from said accounts, from each of said accounts based on said aggregated or stored data.

2. A method according to claim 1, further comprising continuously updating or displaying to the user, in real-time, the status of said aggregated messages.

3. A method according to claim 1, wherein the incoming or outgoing messages are selected from, or are a combination of, messages selected from the following group:
   electronic mail (E-mail) messages;
   voice-mail messages;
   video mail messages;
   Internet/Web-mail messages;
   fax messages.

4. A method according to claim 1, further comprising:
   a) generating aggregated unique IDs by assigning in real-time a unique ID to each message, destined to, or sent from, any account of said user, and generating a list of such aggregated unique IDs of all messages;
   b) storing said aggregated unique ID of each message, in a storage;
   c) repeating step a) for each new message, and updating said list accordingly;
   d) enabling the user to access said storage from any of his accounts; and
   e) upon receiving from said user a request to access a message, routing said request to the location in which said message is stored, according to the unique ID of said requested message, and retrieving said requested message from said location.

5. A method according to claim 4, wherein the location is the actual server which provides messaging services to the account of the user, to which the message is addressed, or from which the message is sent.

6. A method according to claim 4, further comprising unifying different protocols associated with different messages into a common protocol which provides unified messaging services provided by said different protocols, and allowing the user to access messages using said common protocol.

7. A method according to claim 1, wherein the user accesses an aggregated message via a messaging terminal linked to the storage, said messaging terminal being selected from the group:
   a wireline telephone;
   a cellular phone;
   a Web browser;
   a workstation.

8. A method according to claim 4, further comprising adding an indication to each accessed message, for allowing the user to distinguish between messages having different attributes, independently of whether the server where the account is located does or does not add such indication.

9. A method according to claim 1, wherein each message is aggregated by performing the following steps:
   a) reading at least a portion of the message;
   b) transferring said read portion to, and storing it in, the storage.

10. A messaging system providing a centralized access, in real-time, to messages received in, and sent from a plurality of mail accounts of a user, comprising:
    a) means for aggregating, in real-time at a centralized location, data related to incoming and outgoing messages, when said incoming messages are received in and said outgoing messages are sent from said accounts of said user, without storing said incoming and outgoing messages at said centralized location during operations related to said aggregating of said data related to said incoming and outgoing messages; and
    b) means for accessing, by said user, each incoming and outgoing message received in, or sent from said accounts, from each of said accounts based on said aggregated data.

11. A messaging system according to claim 10, in which the aggregated data is at least a part of an incoming or outgoing message.

12. A messaging system according to claim 10, wherein the central message store memory comprises data storage means located at different physical locations.

13. A messaging system according to claim 10, further comprising means for continuously updating or displaying, in real-time to the user the status of said aggregated messages.

14. A messaging system according to claim 10, in which the incoming or outgoing messages are selected from, or are a combination of messages selected from the following group:
    electronic mail (E-mail) messages;
    voice-mail messages;
    video mail messages;
    Internet/Web-mail messages;
    fax messages.

15. A messaging system according to claim 12, in which the location in which the data is stored is the actual server providing messaging services to the account of the user, to which the message is addressed, or from which the message is sent.

16. A messaging system according to claim 10, further comprising circuitry for unifying different protocols associated with different messages to a common protocol, said common protocol providing unified messaging services.

17. A messaging system according to claim 10, comprising messaging terminal means linked to the storage, for accessing an aggregated message, said messaging terminal means being selected from the group comprising:
    a wireline telephone;
    a cellular phone;
    a Web browser;
    a workstation.

18. A messaging system according to claim 10, further comprising circuitry for adding an indication to each accessed message, used to distinguish between different attributes of the messages, particularly between read and unread messages.

19. A messaging system according to claim 10, comprising:
   a) storage memory;
   b) circuitry for reading at least a portion of an aggregated message; and
   c) circuitry for transferring said read portion to, and for storing it in, the storage.

20. Apparatus for providing a centralized access, in real-time, to messages received in, and sent from a plurality of mail accounts of a user, comprising:
   a) a memory for storing at least data related to incoming and outgoing messages, when said incoming messages are received in and said outgoing messages are sent from said accounts of said user, wherein said incoming and outgoing messages are not stored in said memory during operations related to said storing of said data related to said incoming and outgoing messages;
   b) a processor, operating in combination with software or said memory, for displaying or allowing access to incoming or outgoing messages associated with said user from said mail accounts, according to said stored data;
   c) at least one data link, connected to said processor or to said memory, for accessing at least one message storage means containing messages associated with said user; and
   d) at least one data link, connected to said processor or to said memory, for communicating with the interface means of the account through which said user accesses messages.

21. Apparatus for providing a centralized access, in real-time, to messages received in, and sent from a plurality of mail accounts of a user, comprising:
   a) data accumulator for aggregating, in real-time at a centralized location, data related to incoming and outgoing messages, when said incoming messages are received in and said outgoing messages are sent from said accounts of said user, without storing said incoming and outgoing messages at said centralized location during operations related to said aggregating of said data related to said incoming and outgoing messages; and
   b) interface for accessing, by said user, each incoming of and outgoing message received in, and sent from said accounts, from each of said accounts based on said aggregated data.

22. Apparatus according to claim 21, comprising a central message store memory provided with data storage media located at different physical locations.

23. Apparatus according to claim 21, further comprising a data processor for continuously updating or displaying, in real-time to the user the status of said aggregated messages.

24. Apparatus according to claim 21, further comprising circuitry for unifying different protocols associated with different messages to a common protocol, said common protocol providing unified messaging services.

25. Apparatus according to claim 21, comprising a messaging terminal for accessing an aggregated message, said messaging terminal being selected from the group comprising:
   a wireline telephone;
   a cellular phone;
   a Web browser;
   a workstation.

26. Apparatus according to claim 21, further comprising circuitry for adding an indication to each accessed message, used to distinguish between different attributes of the messages, particularly between read and unread messages.

27. Apparatus according to claim 21, comprising:
   a) storage memory;
   b) circuitry for reading at least a portion of an aggregated message; and
   c) circuitry for transferring said read portion to, and for storing it in, he storage.

28. A method according to claim 6, wherein said common protocol is Post Office Protocol version 3 (POP3) or Internet Message Access Protocol version 4 (IMAP4).

29. A messaging system according to claim 16, wherein said common protocol is Post Office Protocol version 3 (POP3) or Internet Message Access Protocol version 4 (IMAP4).

30. Apparatus according to claim 24, wherein said common protocol is Post Office Protocol version 3 (POP3) or Internet Message Access Protocol version 4 (IMAP4).

* * * * *